2,816,909
Patented Dec. 17, 1957

2,816,909
PRODUCTION OF 2-NITROESTERS

Nathan Kornblum and Jack Wesley Powers, West Lafayette, Ind., assignors to Purdue Research Foundation, Lafayette, Ind., a corporation of Indiana No Drawing. Application November 5, 1956,
Serial No. 620,202

3 Claims. (Cl. 260—478)

The present invention relates to the preparation of nitroesters wherein the nitro group, —$NO_2$, is positioned alpha to the carbalkoxyl radical. More particularly, the present invention pertains to the preparation of such nitro compounds, commonly called alpha-nitroesters, from the corresponding alpha-haloesters.

In U. S. patent application Serial No. 568,183, filed February 28, 1956, now U. S. Patent 2,791,604, in the names of R. K. Blackwood and N. Kornblum, having a common assignee with the present application, there is disclosed a method for the preparation of alpha-nitroesters in relatively high yields by treating the corresponding alpha-haloesters with an alkali metal nitrite in a dimethylformamide (DMF) reaction medium and in the presence of a compound selected from the class consisting of phloroglucinol, resorcinol, and catechol; the latter serving as a scavenger for the nitrite esters formed during the reaction which would otherwise destroy the alpha-nitroester that is sought. The process described in the Blackwood and Kornblum application is generally satisfactory, but we have discovered a technique for obtaining still higher yields of the product while at the same time shortening the reaction time.

It is an object of the present invention to provide a novel process for the preparation of alpha-nitroesters. It is a further object of the present invention to provide such a process which is safe, convenient, and economical. Other and additional objects will become apparent from a consideration of the ensuing specification and claims.

We have found that alpha-nitroesters may be obtained in relatively high yields by reacting the corresponding alpha-halo-esters with an alkali metal nitrite in a dimethylsulfoxide (DMSO) reaction medium and in the presence of phloroglucinol, resorcinol, or catechol as a nitrite ester scavenger.

A more complete understanding of the invention may be gained by a consideration of the following examples:

EXAMPLE I

*Preparation of ethyl alpha-nitro-n-valerate*

Ethyl alpha-bromo-n-valerate (60.9 g., 0.30 mole) is poured into a stirred solution of 220 ml. DMSO, 36 g. of sodium nitrite (0.52 mole) and 40 g. of anhydrous phloroglucinol (0.32 mole) in a 500 ml. three necked flask equipped with a sealed stirrer. The flask is stoppered, immersed in a water bath maintained at room temperature, and stirring is continued for 1.5 hours. The reaction mixture is then poured into 600 ml. of ice-water layered over with 200 ml. of diethyl ether. After separation of the upper layer the aqueous phase is extracted four more times with 75 ml. portions of ether. The combined extracts are washed with four 100 ml. portions of water and then dried over anhydrous magnesium sulfate. The mixture is filtered with suction, the magnesium sulfate is washed with four 25 ml. portions of ether and these are combined with the filtrate.

Using a small column, the ether is removed and the residual liquid is rectified. A forerun of 4–5 g. which comes over in the range 58–62°/1 mm. is followed by 44.2 g. (87% yield) of colorless ethyl alpha-nitro-n-valerate (B. P. 62°/1 mm.; $n_D^{20}$ 1.4266).

In a duplicate experiment 52 g. (0.32 mole) of phloroglucinol dihydrate was employed; an 86% yield of colorless ethyl alpha-nitro-n-valerate (B. P. 55°/0.5 mm.; $n_D^{20}$ 1.4266) was obtained.

EXAMPLE II

*Preparation of ethyl alpha-nitro isobutyrate*

The equipment and conditions were similar to those used in Example I. The reagents were 120 ml. of DMSO, 12 g. $NaNO_2$ and 21.8 g. (0.12 mole) ethyl alpha-bromoisobutyrate. The reaction time was 5 hr. The reaction mixture was worked up as in Example I. A 90% yield (16.2 g.) of ethyl alpha-nitroisobutyrate, B. P. 43°/0.8 mm.; $n_D^{20}$ 1.4197 was obtained.

EXAMPLE II-A

The procedure of Example II was repeated, except that 13 g. of anhydrous phloroglucinol was present in the reaction mixture. Ethyl alpha-nitroisobutyrate was obtained in the same yield as was the case in Example II, that is 90%.

EXAMPLE II-B

The procedure of Example II was repeated, except that a comparable quantity of dimethylformamide was used in lieu of the 120 ml. of dimethylsulfoxide. After a reaction time of 44 hours a yield, ethyl alpha-nitroisobutyrate was obtained in a 78% yield.

EXAMPLE III

*Preparation of ethyl alpha-nitroisovalerate*

The equipment and conditions were similar to those used in Example I. The reagents used were 120 ml. DMSO, 20 g. $NaNO_2$, 20 g. of anhydrous phloroglucinol and 30.25 (0.15 mole) of ethyl alpha-bromoisovalerate. The reaction time was 75 hr. The reaction mixture was worked up as in Example I. A 75% yield (18.96 g.) of ethyl alpha-nitroisovalerate, B. P. 66°/1 mm.; $n_D^{20}$ 1.4264 was obtained.

EXAMPLE III-A

The procedure of Example III was repeated, except that 300 ml. of dimethylformamide was substituted for the 120 ml. of dimethylsulfoxide. After a reaction time of 150 hrs., ethyl alpha-nitroisovalerate was obtained in a yield of 67%.

EXAMPLE IV

*Preparation of ethyl alpha-nitro-n-butyrate*

The equipment and conditions were similar to those used in Example I. The reagents used were 200 ml. DMSO, 36 g. $NaNO_2$, 40 g. of anhydrous phloroglucinol and 59.39 g. (0.3 mole) of ethyl alpha-bromo-n-butyrate. The reaction time was 1.5 hr. The reaction mixture was worked up as in Example I. An 83% yield (40.6 g.) of ethyl alpha-nitro-n-butyrate, B. P. 61%/0.7 mm.; $n_D^{20}$ 1.4234 was obtained.

A duplicate experiment employing 52 g. of phloroglucinol dihydrate gave an 83% yield of ethyl alpha-nitro-n-butyrate.

EXAMPLE IV-A

The procedure of Example IV was repeated, except that 600 ml. of dimethylformamide was substituted in lieu of the 200 ml. of dimethylsulfoxide. After a reaction time of 2½ hrs., ethyl alpha-nitro-n-butyrate was obtained in a yield of 72%.

EXAMPLE V

*Preparation of ethyl alpha-nitropropionate*

The equipment and conditions were similar to those used in Example I. The reagents used were 150 ml. DMSO, 28 g. NaNO₂, 28 g. of anhydrous phloroglucinol and 21.3 g. (0.22 mole) of ethyl alpha-chloropropionate. The reaction time was 48 hours. The reaction mixture was worked up as in Example I. A 68% yield (15.9 g.) of ethyl alpha-nitropropionate, B. P. 40°/0.6 mm.; $n_D^{20}$ 1.4203 was obtained.

EXAMPLE VI

*Preparation of ethyl alpha-nitro-n-caproate*

The equipment and conditions were similar to those used in Example I. The reagents used were 60 ml. of DMSO, 7 g. NaNO₂, 7 g. of anhydrous phloroglucinol and 13.9 g. (0.06 mole) of ethyl alpha-bromo-n-caproate. The reaction time was 1 hr. The reaction mixture was worked up as in Example I. A 72% yield (8.44 g.) of ethyl alpha-nitro-n-caproate, B. P. 67°/0.6 mm.; $n_D^{20}$ 1.4294 was obtained.

A duplicate experiment employing phloroglucinol dihydrate gave a 76% yield of ethyl alpha nitro-n-caproate.

EXAMPLE VII

*Preparation of ethyl alpha-nitropropionate*

The equipment and conditions were similar to those used in Example I. The reagents were 225 ml. of DMSO, 36 g. NaNO₂, 40 g. of anhydrous phloroglucinol and 53.70 g. (0.3 mole) of ethyl alpha-bromopropionate. The reaction time was 1.5 hrs. On working up the reaction product as in Example I a 66% yield (28.8 g.) of ethyl alpha-nitropropionate, B. P. 45°/1 mm.; $n_D^{20}$ 1.4204 was obtained.

EXAMPLE VII–A

The procedure of Example VII was repeated, except that 600 ml. of dimethylformamide was substituted for the 225 ml. of dimethylsulfoxide, and 25 g. (0.15 mole) of phloroglucinol dihydrate was used. After a reaction time of 5 hrs. ethyl alpha-nitropropionate was obtained in a 64% yield.

It will be apparent from the foregoing examples that the reaction of the alkali metal nitrite and the alpha-haloester is inherently more effective when conducted in a dimethylsulfoxide reaction medium than in dimethylformamide. Not only are higher yields obtained, but reaction times are simultaneously materially reduced. The following table is based on several of the foregoing examples and shows a direct comparison between the dimethylsulfoxide reaction medium of the present invention and dimethylformamide.

SYNTHESIS OF α-NITROESTERS FROM α-BROMOESTERS

| α-Nitroester | Reaction time (hours) | | Percent Yield | |
|---|---|---|---|---|
|  | DMSO | DMF | DMSO | DMF |
| Ethyl α-nitropropionate | 1.5 | 2 | 66 | 62 |
| Ethyl α-nitro-n-butyrate | 1.5 | 2.5 | 83 | 70–75 |
| Ethyl α-nitroisobutyrate* | 5 | 44 | 91 | 78 |
| Ethyl α-nitroisovalerate | 75 | 150 | 75 | 67 |

* No phloroglucinol employed.

As is the case in the dimethylformamide reaction medium, the scavenger may be dispensed with where the α-nitroester salt has no hydrogen on the alpha carbon atom (Example II–B). In such cases, the scavenger is not needed since the α-nitro ester can be obtained in good yields without a scavenger. However, if the scavenger is added it will not affect or interfere with the reaction. If there is an α-hydrogen atom on the ester which is sought, even small amounts of the nitrite ester which would normally be produced in the reaction will promote the destruction of large amounts of the desired nitroester. In the absence of the scavenger, in such a case, little or no α-nitroester can be obtained from the α-haloester.

Though resorcinol and catechol are operative, as scavengers, they are distinctly less efficient than phloroglucinol, and the latter represents by far the most preferred embodiment of the scavenger to be used.

Temperature does not appear to greatly affect the present process. The temperature can be varied widely, for example, from very low temperatures in the neighborhood of 0° C. to relatively high temperatures in the neighborhood of 100° C. without interfering with the successful conduct of the process. Generally speaking, temperatures below 30° C. are preferred since the scavenger functions most efficiently at the lower temperatures.

The reaction of the present invention may be represented as follows:

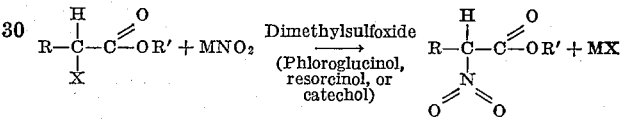

where X is a bromine, iodine, or chlorine atom, R and R' are the same or different alkyl, cycloalkyl, aryl, alkaryl radicals, or segments of a cycloalkyl radical and M is an alkali metal, such as sodium, potassium, or lithium. As can be seen from the examples, the alpha-nitroester product in yields of 66–91% is obtained.

Alpha-nitroesters prepared by the present invention are useful in a wide variety or organic syntheses, especially in the pharmaceutical field. The nitroesters may be reduced to the aminoesters from which the amino acids may easily be obtained. Ethyl nitro-malonate, which may be prepared from ethyl bromomalonate by the process of the present invention, can be used in the preparation of tryptophane, an important alpha-amino acid, according to the method of Lyttle and Weisblatt set forth in the American Chemical Society Journal, vol. 69 (Aug.–Dec. 1947), pages 2118–9.

Having thus described our invention, we intend to be limited only by the following claims.

We claim:

1. A process for preparing an alpha-nitroester having an alpha-hydrogen from the corresponding alpha-haloester which comprises mixing the alpha-haloester in dimethylsulfoxide with an alkali metal nitrite and a compound selected from the class consisting of phloroglucinol, resorcinol, and catechol.

2. A process as in claim 1, wherein the last-named compound is phloroglucinol.

3. A process as in claim 1, wherein the alkali metal nitrite is sodium nitrite.

No references cited.

UNITED STATES PATENT OFFICE

Certificate of Correction

Patent No. 2,816,909  December 17, 1957

Nathan Kornblum et al.

It is hereby certified that error appears in the above numbered patent requiring correction and that the said Letters Patent should read as corrected below.

In the heading to the printed specification, line 2, title of invention, for "PRODUCTION OF 2-NITROESTERS" read —PRODUCTION OF α-NITROESTERS—; in the printed specification, column 2, line 60, for "61%" read —61°—.

Signed and sealed this 4th day of March 1958.

[SEAL]

Attest:
KARL H. AXLINE,
*Attesting Officer.*

ROBERT C. WATSON,
*Commissioner of Patents.*